Jan. 13, 1931.　　　　　L. KEELER　　　　1,788,434
APPARATUS FOR RECORDING ARTERIAL BLOOD PRESSURE
Filed July 30, 1925　　3 Sheets-Sheet 1

INVENTOR
LEONARDE KEELER
BY White Prost
his ATTORNEYS

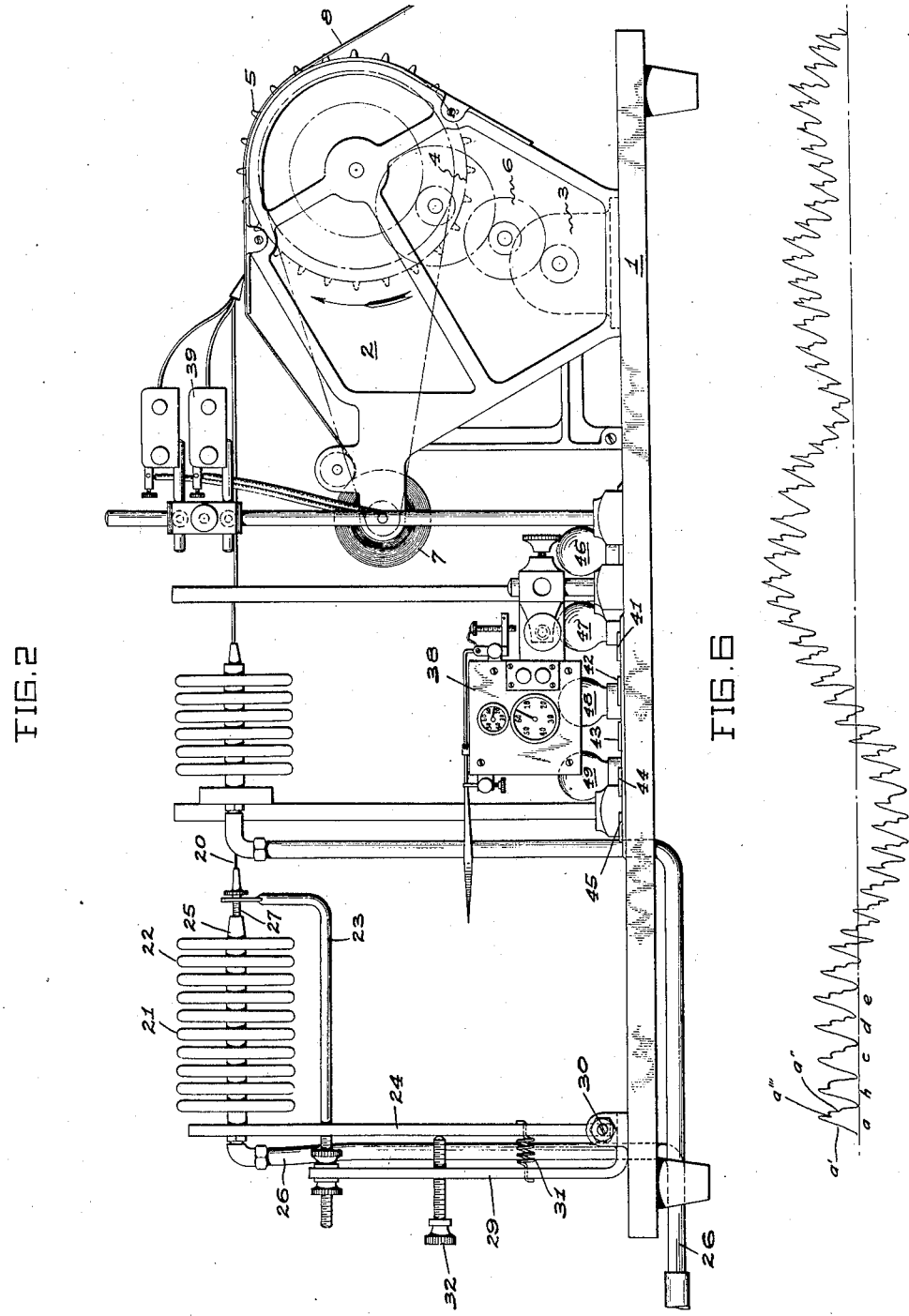

Jan. 13, 1931. L. KEELER 1,788,434
APPARATUS FOR RECORDING ARTERIAL BLOOD PRESSURE
Filed July 30, 1925 3 Sheets-Sheet 3
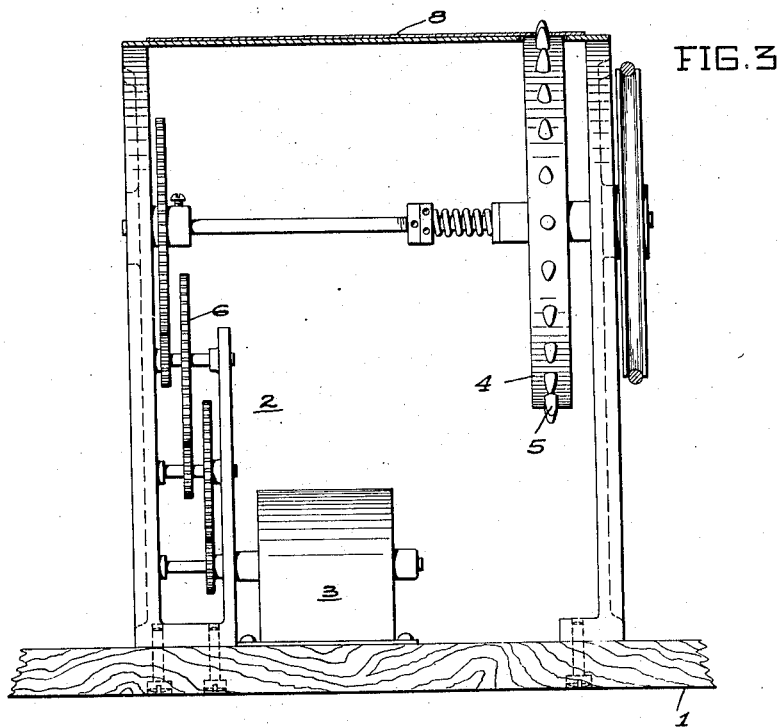
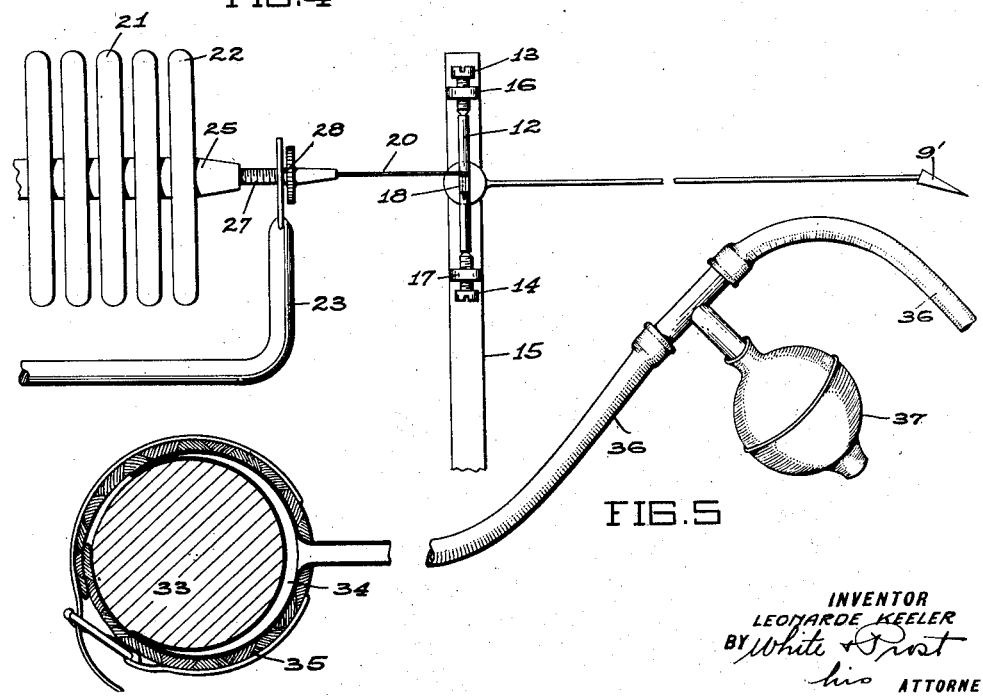
INVENTOR
LEONARDE KEELER
BY White Prost
his ATTORNEYS Patented Jan. 13, 1931

1,788,434

UNITED STATES PATENT OFFICE

LEONARDE KEELER, OF BERKELEY, CALIFORNIA

APPARATUS FOR RECORDING ARTERIAL BLOOD PRESSURE

Application filed July 30, 1925. Serial No. 46,986.

This invention relates to means for recording cardiac cycles and other oscillations in arterial pressure simultaneously. Sphygmographs are well known in the art. Sphygmograms, or the series of connected curves recorded by a sphygmograph, indicate cardiac cycles only, in which the up stroke is the systole curve and the down stroke the diastole curve. In addition to the pressure oscillations of the cardiac cycle, there are slower oscillations, which are more or less irregular and which may be superimposed on a considerable number of cardiac cycles. The slower oscillations in the arterial pressure may be due to various factors such as for example, respiratory movements, rhythmic variations in the activity of the vasoconstrictor center or in the cardiac activity. Heretofore, it has not been possible to record graphically a curve combining the cardiac cycle, which showed the systolic and diastolic pressures and dicrotic notch and the slower oscillations, and it is an object of this invention to provide means for accomplishing this purpose. The curves referred to will be better understood from the detailed description hereinafter in connection with the drawings in which such curves are illustrated.

My invention also has been found of great value in connection with making certain psychological tests based on arterial blood pressure variations. In such cases I have simultaneously recorded with means embodying my invention two curves taken from different parts of the body, such for example, as the two arms, two legs, one arm and one leg, etc. My invention may also record a respiration curve, which curve is recorded simultaneously with the two aforesaid curves. An apparatus of this character will be more fully described hereinafter.

It is an object of the invention to provide means whereby the sphygmogram or cardiac cycle may be recorded simultaneously with and be superimposed on the slower oscillations in the arterial pressure, whereby the characteristics of each as well as their relation to each other at any moment may be readily ascertained.

The invention possesses other advantageous features, some of which with the foregoing will be set forth at length in the following description where I shall outline in full that form of the invention which I have selected for illustration in the drawings accompanying and forming part of the present specification. In said drawings I have shown one form of device embodying my invention, but it is to be understood that I do not limit myself to such form, since the invention as set forth in the claims may be embodied in a plurality of other forms.

Referring to the drawings:

Fig. 2 is a side elevation of the apparatus shown in Fig. 1.

Fig. 3 is an end view illustrating the mechanism of the kymograph.

Fig. 4 is an enlarged detail view illustrating the mechanism connecting a tambour unit with a stylus of the kymograph.

Fig. 5 is a cross-sectional view of a brachial cuff with the inflator and tubes shown in elevation; and Fig. 6 illustrates an enlarged specimen of a graphic record obtained by my invention.

Figure 1:
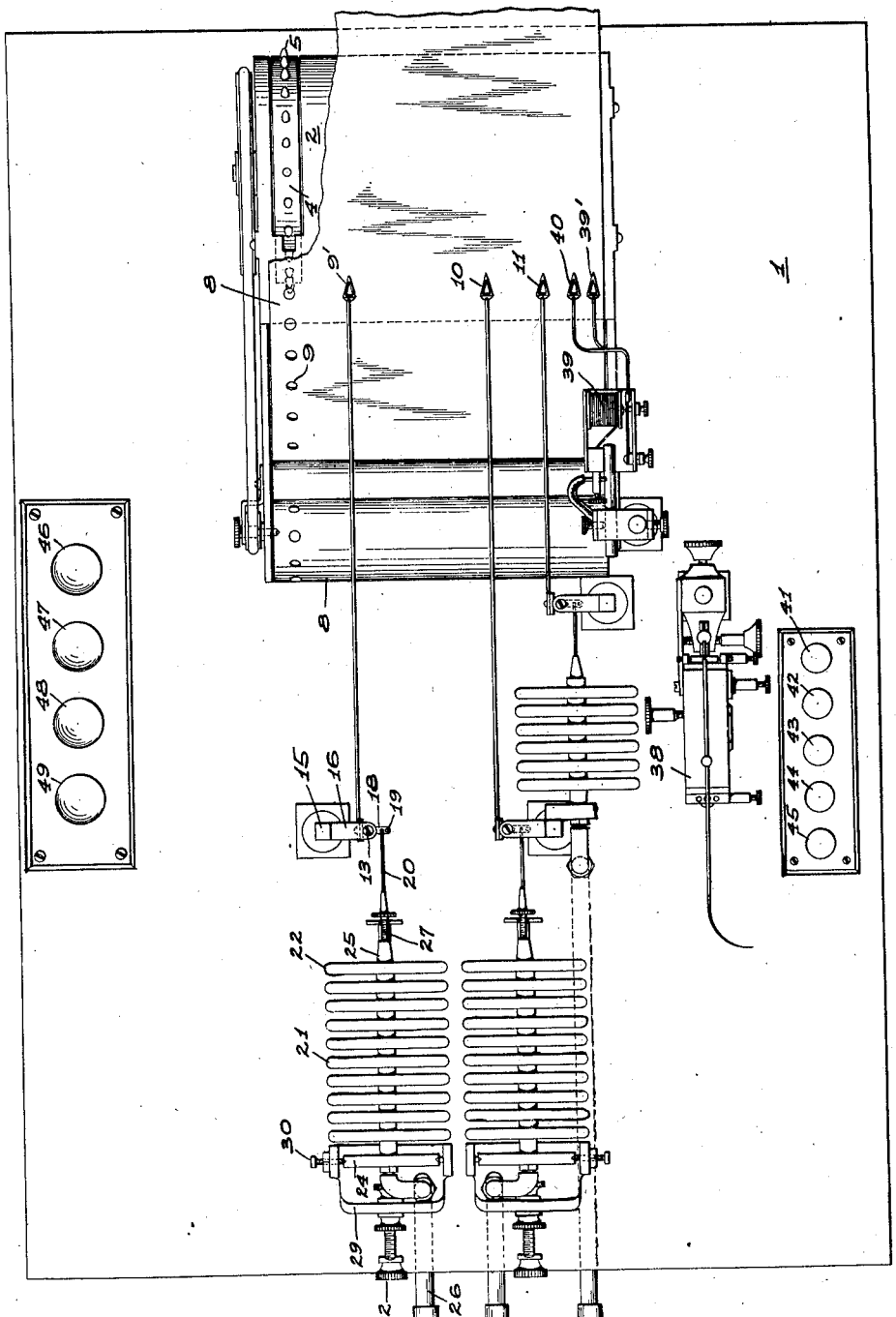
Figure 1 is a top plan view of apparatus embodying my invention.

Apparatus embodying my invention is preferably mounted on a suitable base 1 and includes a kymograph 2, which comprises a motor 3 which drives a roller 4, having a plurality of teeth 5 on its periphery, through a suitable gear train indicated as a whole by the numeral 6. The kymograph is provided with a suitable supply roll 7, which carries smoked paper 8 or any other suitable medium for receiving records. The paper 8 is provided with holes 9 adapted to be engaged by the teeth 5 so as to draw the paper through the kymograph in a well understood manner. This apparatus is well known and does not of itself form a part of my invention as any standard type of apparatus for accomplishing the same result may be employed.

Records or graphs are traced on the paper 8 by a stylus of which three are shown, designated 9', 10 and 11, although it is to be understood that I do not limit myself to any particular number. Since each of the styli is actuated by similar mechanism embodying my invention, a description of one will be sufficient, and will best be understood by referring to Figs. 1 and 4. The stylus 9' is secured at right angles to a small shaft 12, (Fig. 4) preferably at a point midway between the ends thereof, and the shaft is rotatably supported by two adjustable screws 13 and 14. Preferably the ends of the shaft are provided with conical depressions to receive the ends of said screws which are suitably pointed. The screws 13 and 14 are supported on a fixed vertical member 15 by two arms 16 and 17 and the axis of shaft 12 as it appears in Figure 1 is in a plane at right angles to the plane of paper 8, which is preferably horizontal as shown. The shaft 12 is provided with a small lever 18, positioned preferably at a point midway between the ends of the shaft. The lever 18 is provided with a hole 19 to receive a hook or L-shaped member 20. A plurality of holes 19 may be provided so that the member 20 may be placed in different ones for the purpose of adjusting the amount of leverage. The member 20 is connected in a manner hereinafter described to the end of a tambour unit 21, which comprises a series of metal tambours 22, whereby vibrations or motion transmitted to the tambours 22 may be transmitted to the stylus 9', the amplification of such motion or vibrations of course being determined by the lengths of the lever 18 and stylus 9'. The tambour unit 21 is supported at one end by an L-shaped member 23 and at its opposite end by a vertical member 24, as best shown in Fig. 2. The interiors of the tambours 22 are all in communication with each other. The tambour 22 adjacent the member 20 is closed, as indicated at 25 and the tambour 22 at the opposite end of the unit is open and connected with a pipe 26. For the purpose of maintaining the tambour unit 21 in any desired distended position, such for example as to correspond to a given pressure, adjusting means have been provided. These comprise the provision of a screw 27 which is swiveled on the end of member 20 and adapted to engage threads in the end 25 of the tambour unit 21, and a shoulder 28 (Fig. 4) bearing against the support 23. Thus when the screw 27 is rotated, the tambour unit 21 may be fixed in a given distended position with respect to the member 23. The L-shaped member is supported on a fixed vertical element 29 as shown in Fig. 2, and may extend through an opening in the member 24, not shown. The member 24 is pivotally connected to the base 1 at 30 and normally urged toward the fixed element 29 by a spring 31. The distance between the members 24 and 29 is regulated by a screw 32 in a manner readily understood. In this manner the end of the tambour unit adjacent the pipe 26 may also be held in a distended position. I preferably employ both the screws 27 and 32 for adjusting the tambour unit. The purpose of the adjustment will be better understood from the following description. In Fig. 5, an arm of a person is indicated in cross-section at 33 which is partially surrounded by a rubber bag 34 held in position by a leather cuff 35. The rubber bag is connected by means of a suitable tube 36 with a pump 37 and with the pipe 26 which communicates with the interior of the tambour unit 21. The bag 34 is inflated by means of the pump 37 to a pressure at which pulsations impart a free motion to the stylus. As the stylus would now travel through a wide arc, and be likely to jump from the paper 8, the tambour unit 21 is adjusted in the manner described to a distended position corresponding to the pressure at this time. Thereafter the travel of the stylus is limited in a manner readily understood.

By means described, I secured a graphic record of the character shown in Fig. 6. Heretofore sphygmographs have been obtained showing the cardiac cycle which was similar to the first five cycles shown in Fig. 6 designated $a$ to $e$ inclusive, in which the upward line $a'$ to the peak indicates the systolic pressure, the downward line $a''$ the diastolic pressure and $a'''$ the dicrotic notch. These cycles were uniform with respect to a given line. The applicant's invention, however, produces a new and additional result. While maintaining the individual characteristics of each cardiac cycle, the same are imposed upon a wave, which may rise or fall irregularly as shown in Fig. 6. It has been found that this wave may be varied by physical, psychological or emotional changes; however, the applicant does not undertake to analyze at this time the properties of the curve obtained. The same is the subject matter of study by the medical profession, and it is now known that the curve is different from any other curve heretofore obtained.

While my invention probably has its greatest application in the field of the medical profession, for purposes of illustration I have shown the same embodied in apparatus for making certain psychological tests. This apparatus is provided with two styli, 9' and 10, with associated mechanism similar to that above described; however, in one case the impulse transmitting means is connected with an arm and in the other case to the other arm or a leg or in each case said means are connected with a leg, whereby parallel records are obtained from different portions of the body. The stylus 11 is connected with means for recording a respiration curve. This apparatus may also comprise a clock-mechanism 38, which controls the circuit of an electromagnet 39 for indicating time intervals on the paper 8, said magnet actuating a stylus 39'. In carrying out the tests, the person under examination is subjected to questioning and his various reactions are indicated in the graphs recorded. In order to indicate on the record the time when certain questions are asked, a time marking device is provided which comprises an electromagnetically actuated stylus 40, which may be controlled by a push button 41. Four other push buttons, 42, 43, 44 and 45 are also shown which control signal lamps 46, 47, 48 and 49 respectively so that a signal may be flashed to a remote point to indicate what the recorded graphs show. This arrangement is provided as the person conducting the examination may be at a distance from the device and not be able to read the indications, and thus avoid any conversation which may be heard by the person under examination. The particular construction shown is designed for use by the police in making criminal investigations.

I claim:

1. Apparatus of the character specified comprising a series of metal tambours, means for transmitting pressure to the same, a pivoted member supporting one end of said series, a fixed parallel member, means normally urging said pivoted member toward said fixed member, means for adjusting the distance between said fixed and pivoted members, a screw at the opposite end of said series of tambours, means for supporting said screw carried by said fixed member, a pin swiveled to said screw and an indicating lever actuated by said pin.

2. Apparatus of the character described comprising a pivoted indicating member, a series of connected metal tambours, means for transmitting pressure to said tambours, means for holding the tambours in a distended position, and means for transmitting the movements of said tambours to said indicating member, comprising an adjustable member secured to the end tambour of said series and engaging said indicating member.

3. Apparatus of the character described comprising a pivoted indicating member, a series of connected metal tambours, means for transmitting pressure to said tambours, means for holding the tambours in a distended position, means for transmitting the movements of said tambours to said indicating member comprising an adjustable member secured to the end tambour of said series and engaging said indicating member, and means for varying the position of the series of tambours with respect to said indicating element.

4. The method of indicating the psychological and physical condition of a patient comprising simultaneously recording both the cardiac cycle and general variations in blood pressure upon a single curve.

5. In a sphygmograph having pressure transmitting means adapted to be applied to the body of a patient for transmitting variations in blood pressure and a recording device; an actuating means interposed between said first mentioned means and said recording device for actuating said recording device in response to blood pressure variations, said actuating means being so constructed and arranged that it is sensitive to fluctuations in the cardiac cycle and to fluctuations in blood pressure other than the cardiac cycle, whereby a continuous record is obtained comprising a curve of the blood pressure fluctuations having the cardiac cycle superposed thereon.

6. In a sphygmograph having pressure transmitting means adapted to be applied to the body of a patient for transmitting variations in blood pressure, and a recording device; an actuating means interposed between said first mentioned means and said recording device for actuating said recording device in response to blood pressure variations, said actuating means having freedom of movement over a range of pressure variations which includes the cardiac cyclic and arterial pressure variations, whereby a continuous record is obtained comprising a curve of the blood pressure fluctuations having the cardiac cycle superposed thereon.

7. In a sphygmograph having pressure transmitting means adapted to be applied to the body of a patient for transmitting variations in blood pressure, and a recording device; an actuating means interposed between said first mentioned means and said recording device for actuating said recording device in response to blood pressure variations, said actuating means having freedom of movement over a range of pressure variations which includes the cardiac cyclic and arterial pressure variations, and being substantially equally sensitive over said range, whereby a continuous record is obtained comprising a curve of the blood pressure fluctuations having the cardiac cycle superposed thereon.

8. In a sphygmograph having pressure transmitting means adapted to be applied to the body of the patient for transmitting variations in blood pressure, and a recording device; an actuating means interposed between said first mentioned means and said recording device for actuating said recording device in response to blood pressure variations, said actuating means comprising a series of metal tambours so constructed and arranged that the recording device is responsive to cardiac cyclic fluctuations and arterial pressure variations, whereby a continuous record is obtained comprising a curve of the arterial pressure having a cardiac cycle superposed thereon.

In testimony whereof, I have hereunto set my hand.

LEONARDE KEELER.